United States Patent Office 3,646,170
Patented Feb. 29, 1972

3,646,170
DISPERSIONS OF CYCLIC ESTER/ALKYLENE OXIDE COPOLYMERS WITH A POLYMERIC DISPERSING AGENT
Robert Dean Lundberg, Somerville, N.J., and Frank Paul Del Giudice, Charleston, W. Va., assignors to Union Carbide Corporation, New York, N.Y.
No Drawing. Filed Apr. 1, 1969, Ser. No. 812,322
Int. Cl. C08g 17/017
U.S. Cl. 260—899
8 Claims

ABSTRACT OF THE DISCLOSURE

Dispersions of linear cyclic ester/alkylene oxide copolymers are produced by reacting an admixture comprising cyclic ester and alkylene oxide monomers, interfacial agent and catalyst, in the presence of certain inert organic vehicles.

---

French Pat. No. 1,372,333 discloses that a propiolactone and an alkylene oxide, other than propylene oxide, can be polymerized to solid products using various ionic catalysts. The prior art also discloses that mixtures of cyclic ester such as epsilon-caprolactone and methyl-epsilon-caprolactone can be polymerized at fast reaction rates, especially in the presence of anionic catalysts, to yield relatively high molecular weight products; note U.S. Pat Nos. 3,021,309 through 3,021,317. The polymerization of such admixtures of cyclic esters can be carried out either in bulk or in solution. Both of these routes, however, are plagued with disadvantages and difficulties, especially in large scale manufacturing.

It has been discovered quite unexpectedly, indeed, that a dispersion of copolymers may be prepared by polymerizing an admixture containing cyclic ester monomer and an alkylene oxide monomer, an interfacial agent, and any catalyst known to effect the copolymerization of cyclic esters and alkylene oxides, under essentially anhydrous conditions, in the presence of an inert, relatively non-polar, organic vehicle in which the monomers employed are soluble and the resulting copolymer produced is insoluble, and for a period of time sufficient to produce said particulate copolymers.

It should be noted at this time that the term "copolymer(a)," as employed herein including the appended claims, is used in its generic sense and thus embraces polymers formed from the polymerization of two or more polymerizable monomers.

Unlike various prior art bulk and solution processes in which the resulting copolymers oftentimes end up as a monolithic mass, the practice of the present process results in the production of novel copolymers which are obtained as a dispersion of discrete particles of relatively uniform size in the polymerization reaction medium. The process economies of obtaining copolymer in discrete particle form in an inert organic vehicle in contrast to a monolithic mass are obvious both with respect to the novel polymerization process as well as in the handling and utilization of the novel copolymer product therefrom. In addition, the practice of the present process results in excellent process control of the polymerization reaction. High solids capabilities upwards to 65 weight percent solids, and higher, in the reaction medium can be obtained utilizing the novel porcess. Moreover, the conversion of monomers to particulate copolymer is high. Recovery of unreacted monomers and inert organic vehicle from the reaction product mixture is relatively simple. The novel copolymer is obtained in discrete, free-flowing, non-agglomerative form in an inert organic vehicle and in highly satisfactory purity.

The interfacial agents employed in the practice of the novel process are organic polymers which have a reduced viscosity value of from about 0.05 to about 10, and higher, said interfacial agent being characterized (1) by a solvatable constituent (i) which is solvatable in inert, normally-liquid, saturated, acyclic hydrocarbons (ii) which is incompatible with the particulate linear copolymeric product, and (iii) which has an average molecular weight up to about one million, and (2) by an anchoring constituent (i) which is non-solvatable with such inert, normally-liquid, saturated, acyclic hydrocarbons, (ii) which is essentially compatible with said particulate linear copolymers such that it is associated integrally therewith, and (ii) which has an average molecular weight of at least about 1000 and is at least 0.05 to about 10 times the average molecular weight of the solvatable constituent.

The interfacial agents, as indicated above, are organic polymers and most desirably include block and graft copolymers which become associated integrally with the particulate copolymeric product primarily through the anchoring constituent of the interfacial agent. The "block or graft" copolymers, as used herein, have the structure normally implied by such term, that is, they comprise copolymers in which the constituents are present not as random monomer units but as a chain of one polymer to which is attached one or more chains of another polymer. The chains of polymer may comprise one monomer or a random arrangement of two or more monomers. The interfacial agents may be preformed or prepared in situ (during the polymerization reaction and formation of the particulate polymer). Where the block or graft copolymeric interfacial agent is preformed and then added to the reaction medium, any catalyst normally employed in the formation of cyclic ester/alkylene oxide copolymers may be used in the novel process. Where the interfacial agent is formed in situ, it should be noted that the catalyst should be effective not only in the formation of the copolymeric dispersion but also in the formation of the block or graft copolymeric interfacial agent.

As indicated above, the novel process is effected in the presence of an inert organic vehicle in which the resulting particulate copolymer is insoluble. Consequently, the nature of the particulate copolymer which is to be produced will govern the choice of the inert organic vehicle. Since cyclic ester/alkylene oxide copolymers are characterized by a plurality of ester groups, i.e.,

and oxy groups, i.e., —O—, which are polar in nature, a relatively non-polar, inert, organic vehicle which is a liquid under the polymerization reaction conditions is employed in the novel process. Moreover, since the copolymer must be essentially insoluble in the inert organic vehicle, the employment of aromatic liquids as the sole vehicle, e.g., benzene, toluene, etc. should be avoided.

Illustrative inert organic vehicles which are contemplated are the normally-liquid hydrocarbons including the acyclic and alicyclic saturated hydrocarbons such as pentane, hexane, heptane, octane, dodecane, cyclopentane, cyclohexane, cycloheptane, the alkyl-substituted cycloalkanes, decahydronaphthalene, various normally-liquid petroleum hydrocarbon fractions, various high boiling mineral oils, and the like. Mixtures of inert organic vehicles can be employed, and mixtures of the aforesaid illustrated organic vehicles and small amounts of aromatic liquids may be tolerated.

Once having determined the nature and choice of the cyclic ester/alkylene oxide copolymer and inert organic vehicle in the light of the foregoing teachings, one can select the interfacial agent having the suitable constituents thereon.

The solvatable constituent of the interfacial agent may range in size from that of a conventional surfactant up to average molecular weights of several hundreds of thousands, and more. In general, it will have an average molecular weight up to about the million. It is readily appreciated that at molecular weights well below about 1,000 relatively large proportions of solvatable constituents are required, and even then the copolymeric dispersions may be somewhat coarse. Consequently, it is oftentimes desirable that the solvatable constituents have an average molecular weight of at least about 1,000, preferably from about 5,000 to about 100,000.

The nature of the solvatable constituent of the interfacial agent is governed by the nature of the inert organic vehicle. In contrast to the dispersion of cyclic ester/alkylene oxide copolymer, the solvatable constituent should be of a similar degree of polarity to the inert organic vehicle. This is relatively easy to determine since if, for example, a normally-liquid saturated aliphatic hydrocarbon is chosen as the organic vehicle, then the solvatable constituent can comprise a saturated aliphatic hydrocarbon chain.

The anchoring constituent of the interfacial agent most generally has an average molecular weight of at least about 1,000 and is at least about 0.05 to about 10 times the total molecular weight of the solvatable constituents. Desirably the anchoring constituent has an average molecular weight of at least about 2,500 and is at least about 0.25 to about 4 times the total molecular weight of the solvatable constituents. Also, as indicated previously, the anchoring constituent (as well as the dispersion of copolymer) must be essentially insoluble in the inert organic vehicle. Most polymers, however, have only limited compatibility with other polymers, and consequently, it is oftentimes preferred that the anchoring constituent will be of similar polarity as the particulate coform the anchoring constituent of the interfacial agent. is formed in situ no apparent difficulty arises since it is then possible to utilize in the resulting interfacial agent some of the major monomer being polymerized, e.g., epsilon-caprolactone, or some of the relatively low copolymer formed during the course of the polymerization reaction. Under these circumstances the anchoring constituent will be of similar polariyt as the particulate copolymer. Preferably the polymer chains of the anchoring constituent should be somewhat similar in length to those of the resulting copolymeric dispersion.

One convenient method of forming the interfacial agent in situ during the polymerization reaction is to dissolve a polymeric material in the inert organic vehicle. This soluble polymeric material eventually becomes the solvatable component to which a small amount of the monomer(s) becomes graft or block polymerized to thus from the anchoring constituent of the interfacial agent. Preformed block or graft copolymeric interfacial agents can be prepared by conventional methods which are well-documented in the literature. Where the interfacial agent is added to the polymerization reaction medium and it is undesirable that further block or graft copolymerization should occur thereon, the operative conditions and catalyst may be so chosen that polymerization only of the monomer(s) takes place.

A simple test of compatibility is to dissolve in a common solvent the cyclic ester/alkylene oxide copolymer of the type to be prepared during the polymerization reaction and polymeric substance of the type proposed for use as the anchoring constituent of the interfacial agent, then mix the dissolved polymers in the proportions which will be present in the particulate copolymeric product, and thereafter cast a film from the mixed solutions. If the film is clear, then the two polymers are compatible.

In general, the interfacial agents contemplated in the present invention have reduced viscosity values of at least about 0.05, most desirably from about 0.05 to about 10, and preferably from about 0.1 to about 3. As is well known in the art, reduced viscosity value is a measure or indication of the average molecular weight of polymers. Consequently, the average molecular weights of the interfacial agents and the cyclic ester/alkylene oxide copolymers will be indicated by their reduced viscosity values. The expression "reduced viscosity" is a value obtained by dividing the specific viscosity by the concentration of polymer (interfacial agent or particulate copolymer) in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, toluene, chloroform, or other common organic solvents) at 30° C.

Desirable polymeric interfacial agents are those composed of (i) carbon, hydrogen, and oxygen atoms, or (ii) carbon, hydrogen, oxygen, and halogen (preferably chlorine) atoms. The oxygen atoms are generally in the form of etheric oxygen (—O—) or carbonyloxy

Particularly suitable polymeric interfacial agents are those which are essentially free of ethylenic, acetylenic, and benzenoid unsaturation.

Illustrative subclasses of interfacial agents include the block copolymers of $C_6$–$C_{30}$alkyl $\alpha,\beta$-alkenoate and vinyl halide; the graft copolymers of poly($C_6$–$C_{30}$alkyl $\alpha,\beta$-alkenoate-vinyl halide) and cyclic esters; the block copolymers of $C_6$–$C_{30}$alkyl $\alpha,\beta$-alkenoate and vinyl alkyl ether; the graft copolymers of poly($C_6$–$C_{30}$alkyl $\alpha,\beta$-alkenoate-vinyl alkyl ether) and cyclic ester; the block copolymers of $C_6$–$C_{30}$alkyl $\alpha,\beta$-alkenoate and vinylidene halide; the graft copolymers of poly($C_6$–$C_{30}$alkyl $\alpha,\beta$-alkenoate-vinylidene halide) and cyclic ester; the graft and block copolymers of poly($C_6$–$C_{30}$alkyl $\alpha,\beta$-alkenoate) and cyclic ester; the graft and block copolymers of poly(alkenyl alkanoate) and cyclic ester; and the like. It is desirable that the interfacial agent, whether preformed or prepared insitu, contain at least about 20 weight percent of the solvatable constituent, and preferably at least about 30 weight percent of the solvatable constituent. The remainder of the interfacial agent will comprise less than 80 weight percent, preferably less than 70 weight percent, of the anchoring constituent. For example, when the interfacial agent is lauryl methacrylate/vinyl chloride copolymer, the lauryl methacrylate moiety thereof will comprise at least about 20 weight percent and upwards to 99 plus weight percent. At the extreme end of such proportion, the product is, in effect, a homopolymer of lauryl methacrylate. On the other hand, the use of poly (lauryl methacrylate) in the polymerization reaction will result in the in situ formation of a block and/or graft copolymer of poly(lauryl methacrylate) and cyclic ester being polymerized.

Specific interfacial agents include by way of examples the block copolymers of lauryl methacrylate and vinyl chloride; of vinyl stearate and vinyl chloride; of myristyl methacrylate and vinyl chloride; of stearyl methacrylate and vinyl chloride; of stearyl 2-hexenoate and vinyl fluoride; of octyl acrylate and vinyl ethyl ether; of lauryl methacrylate and vinyl ethyl ether; of stearyl methacrylate and vinyl ethyl ether; of pentacosyl methacrylate and vinyl isopropyl ether; of dodecyl crotonate and vinylidene chloride; of myristyl methacrylate and vinylidene chloride; of stearyl methacrylate and vinylidene chloride; of lauryl methacrylate and vinylidene fluoride; of poly(vinyl stearate) and poly(epsilon-caprolactone); of poly(lauryl methacrylate) and poly(epsilon-caprolactone); of poly(stearyl methacrylate) and poly(etacaprylolactone); and the like.

Additional specific interfacial agents can be examplified by the graft copolymers of poly(lauryl methacrylate-vinyl chloride) and epsilon-caprolactone; of poly(myristyl methacrylate-vinyl chloride) and delta-valerolactone; of poly(stearyl methacrylate-vinyl chloride) and zeta-enantholactone; of poly(stearyl 2-hexenoate-vinyl fluoride) and etacaprylolactone; of poly(octayl acrylate-vinyl ethyl ether) and methyl-delta-valerolactone; of poly (lauryl methacrylate-vinyl ethyl ether) and methyl-epsilon-caprolactone; of poly(stearyl methacrylate-vinyl ethyl ether) and dimethyl-epsilon-caprolactone; of poly(pentacosyl methacrylate-vinyl isopropyl ether) and methyl-delta-valerolactone; of poly(dodecyl crotonate-vinylidene chloride) and epsilon-caprolactone; of poly(myristyl methacrylate-vinylidene chloride) and epsilon-caprolactone; of poly(stearyl methacrylate-vinylidene chloride) and 2-keto-1,4-dioxane; of poly(lauryl methacrylate-vinylidene fluoride) and 2-keto-1,4-dioxane; of poly(vinyl stearate) and epsilon-caprolactone; of poly(nonyl methacrylate) and epsilon-caprolactone; of poly(myristyl methacrylate) and epsilon-caprolactone; of poly(lauryl methacrylate) and epsilon-caprolactone; of poly(stearyl methacrylate) and epsilon-caprolactone; of poly(vinyl ethyl ether) and epsilon-caprolactone.

The cyclic esters which are contemplated as monomeric reactants in the practice of the novel process are those which are free of ethylenic and acetylenic unsaturation. These cyclic esters are characterized in that they contain at least six atoms (and upwards to nine atoms), at least four of which are carbon atoms, in the ring nucleus which possess the ester groups, i.e.,

and especially those in which the ring nucleus is composed of carbon and oxygen, said oxygen being present in the form of the ester group,

with/without etheric oxygen, i.e., —O—, also being present in said nucleus. The cyclic ester monomers are further characterized in that they contain no more than four substituents or groups bonded to the carbon atoms of the ring nucleus which contains the ester group. In a preferred aspect, these cyclic ester monomers are characterized in that (a) they possess a ring nucleus composed of carbon atoms and the ester group, (b) they contain no more than 3 substituents bonded to the carbon atoms of said nucleus, and (c) the ring carbon atom which is alpha, i.e., adjacent to the oxygen atom of the ester group (the omega carbon atom in the cyclic ester nucleus) contains no more than one substituent on said carbon atom. The cyclic ester monomers which are composed of (1) carbon, hydrogen, and oxygen atoms, represent a further preferred class. In this respect, the oxygen is present in the form of the ester group,

with/without etheric oxygen (—O—) being present.

Suitable monomeric cyclic esters which can be employed in the novel process are best illustrated by the following formula:

(I)
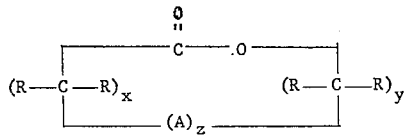

wherein each R, individually, is hydrogen, alkyl, halo, or alkoxy; wherein A is the oxy (—O—) group; wherein $x$ is an integer from 1 to 4, inclusive; wherein $y$ is an integer from 1 to 4, inclusive; wherein $z$ is an integer having a value of zero or one; with the provisos that (a) the sum of $x+y+z$ is at least 4 and not greater than 7, and (b) the total number of substituents other than hydrogen (such as those described for the R variables) attached to the carbon atoms contained in the cyclic ester ring does not exceed 3.

With reference to the Formula I above, illustrative R radicals include, among others, methyl, ethyl, n-propyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed eight.

Representative monomeric cyclic esters which can be employed in this preferred embodiment include, for example, delta-valerolactone, epsilon-caprolactone, zeta-enantholactone, eta-caprylolactone, the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, or tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., monomethoxy-, monoisopropoxy-, dimethoxy-, and diethoxy-, delta-valerolactones and epsilon-caprolactones, and the like; 1,4-dioxane-2-one; and the like. A single cyclic ester monomer or mixtures of such monomers may be employed.

The alkylene oxides which are contemplated as monomeric reactant in the novel process are characterized by the presence of a sole vicinal epoxy groups, i.e.,

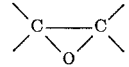

This vicinal epoxy group can form part of an aliphatic chain or be part of a cycloaliphatic nucleus. The vicinal epoxy can be a terminal group of an aliphatic chain, i.e.,

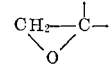

or it can be an internal group. Desirably the alkylene oxides are organic compounds which are composed of (i) carbon, hydrogen, and oxygen atoms, or (ii) carbon, hydrogen, oxygen, and halogen atoms. The oxygen atom(s) is in the form of oxirane oxygen

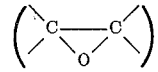

with/without etheric oxygen (—O—) with/without ester oxygen

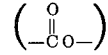

The halogen atom preferably is chlorine.

Suitable alkylene oxides which can be employed are characterized by the following formula:

(II)
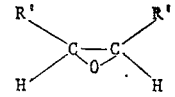

wherein each R', individually, can be hydrogen, alkyl, cycloalkyl, aryl, chloroalkyl, alkenyl, allyloxymethyl, or in which the two R' variables together with both vicinal epoxy carbon atoms of Formula II form a saturated or monoethylenically unsaturated cycloaliphatic hydrocarbon ring having from 4 to 8 carbon atoms, desirably from 5–6 carbon atoms. It is preferred that the alkylene oxide monomers contain from 2 to 12 carbon atoms.

Among the alkylene oxides which deserve special mention include, for example, ethylene oxide, propylene oxide, the butylene oxides, 1,2-epoxydodecane, cyclopentene oxide, cyclohexene oxide, 4-vinylcyclohexene oxide, 1-vinyl-2-epoxyethylcyclobutane, butadiene monoxide, allyl glycidyl ether, ethyl glycidyl ether, epoxycyclooctane, styrene oxide, epichlorohydrin, glycidyl acrylate, glycidyl methacrlate, epoxyethylcyclohexane, and others. Ethylene oxide and propylene oxide are preferred because of their low cost.

The novel polymerization process can be effected in the presence of any catalyst suitable in copolymerizing admixtures containing cyclic esters and alkylene oxides. Desirably such catalysts include the metal halide Lewis acids, such as the trichloride, the tribromide, and the trifluoride of boron; the bromides and the chlorides of aluminum, of tin, and of titanium; the chlorides of antimony, of zinc, of beryllium, of bismuth, of cadmium, of iron, of zirconium; etc. The preferred catalysts are boron trifluoride and its complexes with organic compounds such as ethers, alcohols, and amines as illustrated by boron trifluoride-piperidine complex, boron trifluoride-1,6-hexanediamine complex, boron trifluoride-monoethylamine complex, boron trifluoride-methyl ether complex, boron trifluoride-ethyl ether complex, and the like.

The polymerization catalysts are employed in catalytically significant quantities. In general, the particular catalyst employed, the nature of the monomeric reactants, the operative conditions under which the polymerization reaction is conducted, and other factors, will largely determine the optimum catalyst concentration. A catalyst concentration of from about 0.001 weight percent, and lower to about 5 weight percent, and higher, based on the monomers present in the reaction medium, is suitable. A catalyst concentration of from about 0.01 to about 2 weight percent is preferred.

The concentration of the interfacial agent can vary from about 0.01 weight percent, and lower, to about 10 weight percent, and higher, based on the total weight of the monomers. A practical concentration is from about 0.1 to about 5 weight percent of interfacial agent.

The polymerization reaction can be conducted over a wide temperature range such as from about 0° C. to about 225° C. A more suitable temperature range is from about 20° C. to about 175° C. The optimum temperature to employ may, of course, be significantly influenced by the stability of the resulting copolymeric product and the boiling point of the inert organic vehicle.

The novel process is conducted for a period of time sufficient to produce a dispersion of copolymeric product. In general, the reaction time will vary depending upon the operative temperature, the nature of the monomeric reactants, interfacial agent, and catalyst employed, the choice of the inert organic vehicle, and other factors. The reaction time can vary from several minutes to several days depending on the variables illustrated above. Most desirably, the operative conditions are adjusted so as to achieve a practical and commercially acceptable reaction rate.

The polymerization reaction preferably is effected in the liquid phase in an essentially non-aqueous reaction medium. It is desirable also to effect the polymerization reaction under an inert atmosphere, e.g., nitrogen. Pressure does not appear to be a critical factor. The reaction should be conducted in the essential absence of organic compounds which contain active hydrogen substituents such as carboxyl, hydroxyl, and amino.

The proportions of the monomers can vary over the entire range. It is desirable, however, to employ a major amount, on a mole basis, of the cyclic ester, and a minor amount, on a mole basis, of the alkylene oxide. When employing a saturated alkylene oxide it is preferred that the concentration of the cyclic ester be in the range of from about 65 to about 95 mole percent with the saturated alkylene oxide falling within the range of from about 35 to about 5 mole percent. With unsaturated alkylene oxides, one can employ as little as 0.5 mole percent, e.g., from about 0.5 to about 25 mole percent of unsaturated alkylene oxide and from about 99.5 to about 75 mole percent of cyclic ester. Admixtures containing epsilon-caprolactone and/or 2-ketone-1,4-dioxane plus ethylene oxide and/or propylene oxide are highly preferred as starting material.

The amount of inert organic vehicle employed in the novel process can vary over a wide range. Practical and economic consideration, however, will dictate the quantity of vehicle that is utilized. The copolymeric dispersion can comprise from less than five weight percent solids to more than 65 weight percent in the reaction product mixture. At the lower end of this range one has a very fluid mixture whereas at the higher end of this range the mixture becomes extremely viscous.

One can employ conventional equipment and material generally used in this polymer art. The order of addition of the monomers, interfacial agent, inert organic vehicle, and catalyst to the reaction zone does not appear to be critical. The polymerization reaction is most desirably carried out by agitating the reaction medium such as by stirring.

Unreacted monomeric reactant can be recovered from the reaction product mixture by convention techniques such as heating said mixture under reduced pressure.

The cyclic ester/alkylene oxide copolymers obtained by the practice of the novel process are a useful class of copolymeric compounds. Such copolymers can be recovered from the reaction product mixture by filtration or decantation, followed by drying under reduced pressure and mild temperatures, e.g., about 50° C. This novel polymerization process is admirably suited to the preparation of a dispersion of copolymers, the properties and characteristics of which can be "tailor-made" to fit a wide variety of uses and fields of applications. For instance, those ethylenically unsaturated copolymers which contain a major amount of cyclic ester, e.g., up to about 99.5 mole percent, and a minor amount of an unsaturated alkylene oxide, e.g., as little as about 0.5 mole percent and desirably from about 1 to about 15 mole percent, can be cured by conventional methods employed in the natural and synthetic rubber arts to form tough, crosslinked vulcanizates. Such cures include the use of sulfur, organic peroxides, and radiation as documented in the literature. The particulate saturated copolymers are also highly useful for a variety of applications, for example, in the preparation of various molded and shaped articles, films, etc. As plasticizers, the novel saturated copolymers impart desirable properties and characteristics to vinyl chloride resins. The incorporation of the novel copolymers into such vinyl chloride resins results in a plasticized composition which exhibits good flexibility at temperatures below 0° C. and good low brittle temperatures. In addition, the plasticized compositions exhibit low volatility and good resistance to oil and water extraction.

In a preferred aspect, the invention contemplates the preparation of novel linear cyclic ester/alkylene oxide copolymers which are obtained as a dispersion in the inert organic vehicle. The dispersion of copolymers are characterized in that the average particle size can range from less than one micron to several hundred microns, e.g., upwards to about 1000 microns, and higher.

Suitable novel copolymers are those which possess an average reduced viscosity value of at least about 0.2, e.g., from about 0.2 and upwards to about 15, and higher. The preferred copolymers have an average reduced viscosity value of from about 0.3 to about 10. The novel copolymers are characterized by the recurring structural units designated as III and IV below, that is, Unit III having the formula:

(III)

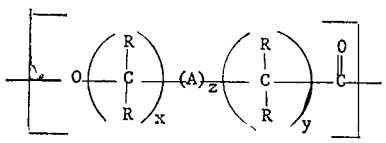

wherein each R, individually, is hydrogen, alkyl, halo, or alkoxy; wherein A is the oxy group, wherein $x$ is an integer from 1 to 4; wherein $y$ is an integer from 1 to 4; wherein $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2; and Unit IV having the formula:

(IV)

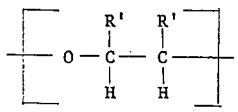

wherein each R', individually, is hydrogen, alkyl, cycloalkyl, aryl, chloroalkyl, alkenyl, allyloxymethyl, or in which the two R' variables together with the ethylene moiety of the oxyethylene chain of Unit IV above form a saturated or monoethylenically unsaturated cycloaliphatic hydrocarbon ring having from 4 to 8 carbon atoms, desirably from 5 to 6 carbon atoms. It is preferred that recurring Unit IV contain from 2 to 12 carbon atoms. Illustrative R' variables include methyl, ethyl, isopropyl, t-butyl, the hexyls, the dodecyls, phenyl, phenethyl, ethylphenyl, cyclopentyl, cyclohexyl, cycloheptyl, vinyl, allyl, allyloxymethyl, propenoyloxy, 2-methylpropenoyloxy, 2-chloroethyl, and the like.

The novel copolymers consist essentially of the interconnection of units (III) and (IV) above wherein the proportion of these units can vary over the entire copolymer range. Desirably the novel copolymers will contain a major amount, on a mole basis, of unit (III), and a minor amount, on a mole basis, of unit (IV). Preferably the novel copolymers contain from about 65 to about 95 mole percent of unit (III), and from about 35 to about 5 mole percent of unit (IV) which is free of ethylenic unsaturation. With unsaturation present in unit (IV), the novel copolymers preferably contain from about 0.5 to about 25 mole percent of unit (IV) and from about 99.5 to about 75 mole percent of unit (III).

The aforedescribed recurring linear units (III) and (IV) are interconnected in substantial random fashion. The interconnection of these units does not involve or result in the direct bonding of two carbonyl groups, i.e.,

or of two oxy groups, i.e., —O—O—, of recurring units (III) and (IV). In other words, the oxy groups (—O—) of one recurring linear unit is interconnected with the carbonyl group

of another recurring linear unit or with the ethylene moiety of the oxyethylene unit, i.e., recurring unit (IV) above. Moreover, since the novel polymers are relatively high molecular weight products, the end groups are not determinable. Infrared analysis fails to disclose the terminal moieties of the relatively high molecular weight polymeric molecules which fact is readily understandable to high polymer chemists.

The novel copolymers, as intimated previously, are associated integrally with the interfacial agent primarily through the anchoring constituent thereof. As little as about 0.01 weight percent, and lower, and upwards to about 10 weight percent, and higher, of the interfacial agent, based on the weight of the copolymer, can be associated integrally with the copolymer. More suitably, from about 0.1 to about 5 weight percent of interfacial agent can be contained in the copolymer. Such interfacial agents are characterized (1) by a solvatable constituent (i) which is solvatable in inert, normally liquid, saturated, acyclic hydrocarbons, heptane, isooctane, etc., (ii) which is essentially incompatible with said linear copolymers, and (iii) which has an average molecular weight up to about one million, desirably at least about 1,000, preferably from about 5,000 to about 100,000, and (2) by an anchoring constituent (i) which is non-solvatable with such inert, normally-liquid, saturated acyclic hydrocarbons, (ii) which is compatible with said linear copolymers such that it is associated integrally therewith, and (iii) which has an average molecular weight of at least about 1,000, desirably at least about 2,500, and is at least about 0.05 to about 10 times, preferably at least about 0.25 to about 4 times, the total molecular weight of the solvatable constituent. The solvatable constituent is relatively non-polar, its polarity being similar to that of the normally-liquid acyclic hydrocarbon. Since the copolymer is also insoluble in such normally-liquid hydrocarbons, the polarities of the solvatable constituent and copolymer will be significantly different. On the other hand, the anchoring constituent is a relatively polar group, its polarity being similar to that of the copolymer. Moreover, since the anchoring constituent is non-solvatable with the normally-liquid hydrocarbon, the polarities of the anchoring constituent and the normally-liquid hydrocarbon will be quite dissimilar.

Particularly preferred novel copolymers are those which are characterized by the oxypentamethylenecarbonyl chain and the oxyethylene chain as depicted in recurring structural units V and VI, respectively, shown below:

(V)

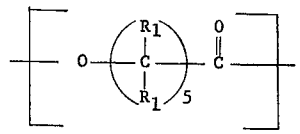

wherein each $R_1$, individually, is hydrogen or lower alkyl, preferably hydrogen or methyl, with the proviso that no more than 3 $R_1$ variables are substituents other than hydrogen; and (VI)

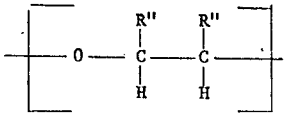

wherein each R'', individually, is hydrogen or lower alkyl, preferably hydrogen, methyl, and ethyl.

In the illustrative examples the chemical designation of various materials employed are as follows:

Siponate DS–10—An anionic surfactant, i.e., dodecyl benzene sodium sulfonate.

Tergitol NPX (10 percent solution)—An anionic surfactant, i.e., hydroxypolyethylene nonylphenyl ether prepared by reacting 10.5 moles of ethylene oxide with one mole of nonylphenol.

Lupersol No. 11 (75 percent solution)—t-Butyl peroxy pivalate in mineral spirits.

In addition, the polymeric material which will function as the interfacial agent, whether preformed or to be prepared in situ, is referred to as the interfacial agent.

All reduced viscosity values referred to herein were measured at a concentration of 0.2 gm./100 ml. of solvent at 30° C.

EXAMPLE 1

To a pressure bottle the following materials were charged:

| | | |
|---|---|---|
| Vinyl chloride | grams | 52.5 |
| Lauryl methacrylate | do | 17.5 |
| H₂O (distilled) | do | 126.2 |
| Siponate DS-10 (98 percent) | do | 1.7 |
| Tergitol NPX (10 percent solution | do | 4.2 |
| t-Dodecyl mercaptan (96 percent) | ml | 0.43 |
| Lupersol No. 11 (75 percent) | ml | 1.09 |

This mixture was heated and maintained at 45° C. for 14.1 hours. Thereafter the reaction product mixture was cooled to room temperature and methanol added thereto. The supernatant liquid was decanted and the resulting dispersion of lauryl methacrylate/vinyl chloride copolymeric product was washed twice in water. The copolymeric product was then dried in air at 55° C. There was obtained 58.0 grams of copolymer which represented an 82.6 percent yield. The product contained 39.3 percent chloride (representing 69.2 percent polymerized vinyl chloride therein). The reduced viscosity of the vinyl chloride/lauryl methacrylate copolymer was 0.58 in cyclohexanone.

EXAMPLE 2

To a pressure bottle the following materials were charged:

| | | |
|---|---|---|
| Vinyl chloride | grams | 53 |
| Lauryl methacrylate | do | 18 |
| H₂O (distilled) | do | 126 |
| Siponate DS-10 | do | 1.7 |
| Tergitol NPX | do | 4.2 |
| t-Dodecyl mercaptan | ml | 0.43 |
| Lupersol No. 11 | ml | 1.1 |

The sealed bottle was placed in a tumbler at 45° C. for a period of 13 hours. The resulting reaction product was then filtered and the retained solids washed with methanol. The solids were then osterized in methanol, filtered, and dried in air at 55° C. There was obtained 167.5 grams of vinyl chloride/lauryl methacrylate copolymeric product which had a reduced viscosity of 0.42 in cyclohexanone. This copolymer product contained 33.4 percent chloride, which represented a vinyl chloride content of 58.9 percent, the remainder being lauryl methacrylate. The yield was 59.8 percent.

EXAMPLE 3

To a reaction flask, there were charged 50 grams of lauryl methacrylate, 50 grams of acetone, and 0.78 cc. Lupersol No. 1. The reaction flask was purged with nitrogen and then capped. The flask was placed in a tumbler maintained at 50° C. for a period of 31 hours. The resulting reaction product mixture was cooled to room temperature and the poly(lauryl methacrylate) product was precipitated with methanol. This product was then washed with methanol and dried in air. There was obtained 47 grams of poly(lauryl methacrylate) which was characterized as clear and tacky. The reduced viscosity of this polymeric product was 0.24 in cyclohexanone. The yield was 94 percent.

EXAMPLE 4

To a round bottom 3-neck flask there were charged 100 gms. heptane, 86 gms. epsilon-caprolactone, 14 gms. ethylene oxide, and 5 gms. of lauryl methacrylate/vinyl chloride copolymer described in Example 1 above. The flask was then charged with 0.67 gm. phosphorus pentafluoride (0.5 mole percent of total monomer charge). A stirrer and reflux condenser were attached to the flask and the mixture warmed to 50°–60° C. while stirring moderately. The temperature was maintained at 50°–60° C. and stirring continued for about 24 hours. The resulting epsilon-caprolactone/ethylene oxide copolymeric product was a dispersion of fine round particles of uniform size throughout. The dispersion retained its appearance upon cooling to room temperature. The dispersion was free-flowing and although the particles settled out upon standing they could be readily redispersed.

EXAMPLE 5

To a 1.5 gallon autoclave, there is charged, by weight, 30 parts of epsilon-caprolactone, 5 parts of propylene oxide, 70 parts of heptane, and 1 part of poly(vinyl stearate) having a reduced viscosity of 0.17 in toluene (added as 50 weight percent solids in heptane). The resulting mixture was heated to 75° C. and 0.2 part by weight of boron trifluoride-etherate was added thereto. The mixture was maintained at 80° C. for 24 hours under a nitrogen blanket. There was obtained a dispersion of epsilon-caprolactone/propylene oxide copolymer.

EXAMPLE 6

In a manner similar to Example 4 above, when cyclohexene oxide and poly(lauryl methacrylate) interfacial agent of Example 3 are employed in lieu of ethylene oxide and lauryl methacrylate/vinyl chloride, there is obtained a fine dispersion of epsilon-caprolactone/cyclohexene oxide copolymeric product.

What is claimed is:
1. Linear copolymers
   (A) which have a reduced viscosity value of at least about 0.2 and upwards to about 15;
   (B) which are characterized by the following two recurring structural units

I 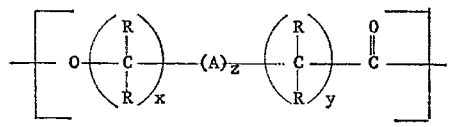

wherein each R, individually, is hydrogen, alkyl, halo, or alkoxy; wherein A is the oxy group; wherein x is an integer from 1 to 4; wherein y is an integer from 1 to 4; wherein z is an integer of zero or one; with the provisos that (a) the sum of x+y+z is at least 4 and not greater than 7, and (b) the total number of R variables which are substituents other than hydrogen does not exceed 3; and II 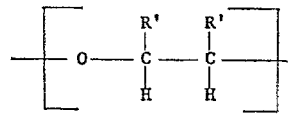

wherein each R′, individually, is hydrogen, alkyl, cycloalkyl, aryl, chloroalkyl, alkenyl, allyloxymethyl, or wherein the two R′ variables together with both carbon atoms of the oxyethylene chain of Unit II above form a saturated or monoethylenically unsaturated cycloaliphatic hydrocarbon ring which has from 4 to 8 carbon atoms;
   (C) which contain integrally associated therewith from about 0.01 to about 10 weight percent of a polymeric interfacial agent which has a reduced viscosity value of from about 0.05 to about 10; said interfacial agent being characterized (1) by a solvatable constituent (i) which is solvatable in inert, normally liquid, saturated, acyclic hydrocarbons, (ii) which is essentially incompatible with said linear copolymers, and (iii) which has an average molecular weight up to about one million, and (2) by an anchoring constituent (i) which is non-solvatable with such inert, normally-liquid, saturated acyclic hydrocarbons, (ii) which is compatible with said linear copolymers such that it is associated integrally therewith, and (iii) which has an average molecular weight of at least about 1,000 and is at least about 0.05 to about 10 times the total molecular weight of the solvatable constituent.

2. The linear copolymers of claim 1 wherein said recurring structural Unit I is

III

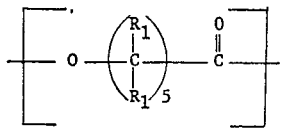

wherein each $R_1$ is hydrogen or lower alkyl, with the proviso that no more than 3 $R_1$ variables are substituents other than hydrogen; and wherein said recurring structural Unit II is:

IV

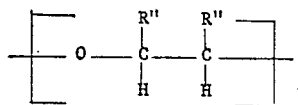

wherein each $R''$ is hydrogen or lower alkyl.

3. The linear copolymers of claim 2 wherein each $R_1$ variable of recurring Unit III is hydrogen.

4. The linear polymers of claim 2 which are obtained as a dispersion in inert normally-liquid saturated acyclic hydrocarbon.

5. The linear copolymers of claim 2 wherein said interfacial agent is composed of (i) carbon, hydrogen, and oxygen atoms, or (ii) carbon, hydrogen, oxygen, and halogen atoms.

6. The particular linear copolymers of claim 2 wherein said recurring unit is the oxypentamethylenecarbonyl group, and wherein said interfacial agent is poly(vinyl stearate)/epsilon-caprolactone graft copolymer.

7. The particular linear copolymers of claim 2 wherein said recurring unit is the oxypentamethylenecarbonyl group, and wherein said interfacial agent is lauryl methacrylate/vinyl chloride copolymer.

8. The particular linear copolymers of claim 2 wherein said recurring unit is the oxypentamethylenecarbonyl group and wherein said interfacial agent is poly(lauryl methacrylate)/epsilon-caprolactone graft copolymer.

References Cited
UNITED STATES PATENTS

| | | | |
|---|---|---|---|
| 2,962,524 | 11/1960 | Hostettler et al. | 260—484 |
| 3,298,977 | 1/1967 | Robertson et al. | 260—3 |
| 3,317,635 | 5/1967 | Osmond | 260—881 |
| 3,383,352 | 5/1968 | Duell et al. | 260—33.6 |

MURRAY TILLMAN, Primary Examiner

J. SEIBERT, Assistant Examiner

U.S. Cl. X.R.

260—33.6 R, 33.6 UA, 874, 875, 900, 901